United States Patent
Gennetten

(12) 
(10) Patent No.: US 6,449,438 B1
(45) Date of Patent: Sep. 10, 2002

(54) ACTIVE TRIPOD MOUNT ENABLES EASY DOCKING BETWEEN ANY COMPLIANT CAMERA AND DOCK

(75) Inventor: K Douglas Gennetten, Ft Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/858,023

(22) Filed: May 15, 2001

(51) Int. Cl.[7] .................. G03B 17/00; F16M 11/04
(52) U.S. Cl. .................. 396/300; 396/419; 248/187.1
(58) Field of Search .................. 396/301, 300, 396/419, 422; 248/177.1, 187.1; 348/233

(56) References Cited

U.S. PATENT DOCUMENTS

| | | | | |
|---|---|---|---|---|
| 4,218,122 A | * | 8/1980 | Drafahl, Jr. ............... | 396/422 |
| 4,673,268 A | * | 6/1987 | Wheeler et al. ............ | 396/419 |
| 5,598,237 A | * | 1/1997 | McIntyre et al. .......... | 396/419 |
| 5,895,127 A | * | 4/1999 | Yamamoto ................ | 396/300 |
| 6,078,756 A | * | 6/2000 | Squilla et al. ............. | 396/300 |

* cited by examiner

*Primary Examiner*—Christopher Mahoney

(57) ABSTRACT

A camera mount includes a body including a flat surface for mounting a camera. A hollow post is located on the flat surface and sized to fit within a mounting hole of the camera. A trigger device for raising and lowering a first connector is located within the hollow post. The first connector mates with a complimentary connector located within the mounting hole of the camera and a second connector is located on the body for connecting to a cable. The second connector is electrically connected to the first connector.

13 Claims, 2 Drawing Sheets

ACTIVE TRIPOD MOUNT ENABLES EASY DOCKING BETWEEN ANY COMPLIANT CAMERA AND DOCK

BACKGROUND OF THE INVENTION

1. Field of the Invention

This invention relates generally to camera mounts and more particularly to an active camera mount for a digital camera.

2. Description of Related Art

A digital camera records and stores photographic images in digital form that can be fed to a personal computer (PC) as the impressions are recorded or stored in the camera for later loading into the PC. Generally, a number of cables must be plugged into or unplugged from the camera when transferring photos from the camera to the PC, charging batteries located within the camera, or connecting an AC power source to the camera.

It is well-known to mount both conventional and digital cameras on a camera tripod and/or other similar well-known camera mount. Conventional camera mounts include a threaded screw on a mounting surface. Conventional and digital cameras include an industry standard threaded mounting hole located on a bottom surface of the camera. The threads of the mounting hole match the threads of the screw on the mounting surface of the camera mount.

Digital cameras may also include a liquid crystal display (LCD) built into the camera that conveys information to a user with respect to the operation of the camera, such as how many more images are capable of being taken and stored by the camera. Other digital cameras include an LCD built into the back of the camera capable of displaying, in color, the images recorded and stored in the camera. The LCD screen may also be used as a viewfinder and allows a user to see what a picture will look like before it is taken. The LCD also allows a user to look at photos already taken and stored within the camera.

Digital camera use solid-state memory flash cards to store images. These flash cards are typically nonremovable memory chips embedded within the camera. More commonly, digital cameras store photos on a removable card that is used to transfer files to the computer. These cards, which can range in size from 4 to 256 MB, come in two primary configurations—CompactFlash and SmartMedia. Additionally, some newer cameras accept the new CompactFlash drives, which provides up to 1 GB of storage space for data. However, a card reader or adapter is required to read files into the PC which must be connected to the PC's small computer systems interface (SCSI) or USB (universal serial bus) port if a card slot is not built into the PC. Smart Media cards store a maximum of 64 megabytes, but they easily download on a reader that connects to the PC's floppy disk drive. Once the card is placed in the reader, the PC's transfer software is launched to transfer the photos from the camera. The camera is connected to the PC in order to transfer photos from the camera to the PC. Some digital cameras can output photos directly to a floppy disk or via cable to a PC.

Digital cameras consume a great deal of battery power. Many digital cameras can be plugged in for stationary use, and some run off external battery packs. When a digital camera is connected, or docked, to a PC, its color display is generally turned off and unusable. When a digital camera is un-docked, its LCD display consumes too much power to be left on for any length of time. When the digital camera is in use, it is suggested that the camera's LCD display be turned off to conserve battery power for taking and storing photo images.

Once images are transferred from the digital camera to the PC, they may be printed into a hard copy using a color printer. The software for the camera allows the images to be viewed on the PC. Images may be saved to a floppy disk or the hard drive. Images can be saved in a specific graphic file format, e.g., gif or jpg for Web publishing, pcx or bmp for paper publishing. A graphics program, such as Paint Shop Pro, may be used to edit the images.

However, many steps are involved in transferring images from a digital camera to the PC. In order to transfer images from the digital camera to the PC, it is necessary to hook the camera up to the PC using various cables. If digital photos are taken using a tripod or other mounting surface, it is first necessary to detach the camera from the surface in order to connect the camera to cables from the PC. This is a time-consuming and inefficient process. Additionally, as stated above, the LCD of a digital camera is a heavy drain on the camera's batteries. If a user wishes to use the LCD of the digital camera while the camera is mounted on a tripod or other camera mount, the drain on the batteries limits the number of photos the camera may take during use. Also, if a user is taking digital photos using a tripod or other camera mount, the user may be in a location away from the user's PC. Even if a user were to download digital photos to a portable notebook computer, the user must still disconnect the digital camera from the camera mount to connect the camera to the notebook computer. There is a need for a camera mount which eliminates the steps of removing the camera from the mount to transfer digital photos to a PC or notebook computer. There is also a need for a camera mount that supplies power to a camera while the camera is in use.

SUMMARY OF THE INVENTION

In accordance with this invention, a camera mount includes a body including a flat surface for mounting a camera. A hollow post is located on the flat surface such that the post is sized to fit within a mounting hole of the camera. The camera mount further includes a trigger device for raising and lowering a first connector located within the hollow post where the connector mates with a complementary connector located within the mounting hole of the camera. A second connector is located on the body for connecting to a cable such that the second connector is electrically connected to the first connector.

This invention will be more fully understood in light of the following detailed description taken together with the accompanying drawings.

BRIEF DESCRIPTION OF THE DRAWINGS

Use of the same reference symbols in different figures indicates similar or identical items.

DETAILED DESCRIPTION OF THE PREFERRED EMBODIMENTS

A new active camera mount solution for digital cameras provides power and data connections. A camera mount provides a solution for camera docking that does not interfere with important controls and surfaces of existing or future camera designs. This illustrative camera mount does not require the addition of interfaces to the exterior of a digital camera and may be used in a variety of digital camera docking situations including, without limitation, camera tripods, photo printers, docking stations. This illustrative camera mount provides data and power connections within the confines of the industry screw mount standard.

Figure 1A:
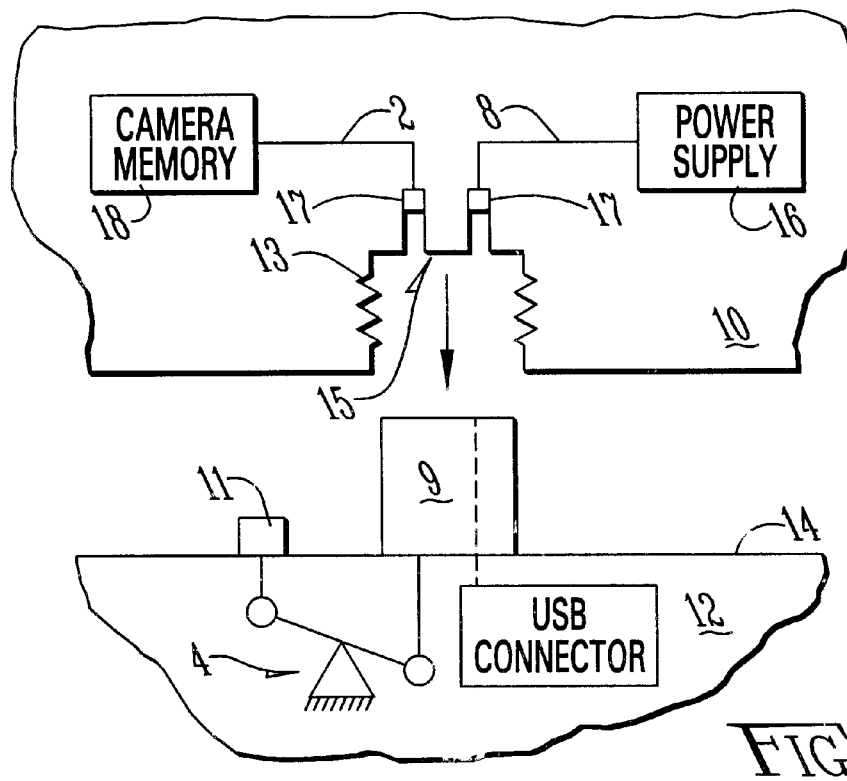
FIG. 1A illustrates a cross-sectional view of a digital camera positioned above a camera mounting surface.

In accordance with an embodiment of the invention, FIG. 1A illustrates a digital camera 10 being lowered to a surface 14 of a camera mount 12. Digital camera 10 includes a power supply 16 for powering camera 10, a memory 18 for storing digital images, and a threaded mounting hole 13. Mounting hole 13 is threaded to allow camera 10 to be able to be mounted to a mounting screw of a conventional camera tripod or other similar mounting surface. A female jack 15 is located on the top surface of hole 13. Jack 15 includes a number of pin contacts 17, in one example four. At least two pin contacts 17 are electrically connected to memory 18 (i.e., the processor of camera 10) via a cable or wire 2. At least two additional pin contacts 17 are electrically connected to power supply 16 via a cable or wire 8. Camera 10 may be powered by a battery source, connected to an AC source or connected to the power source of another device.

Figure 1B:
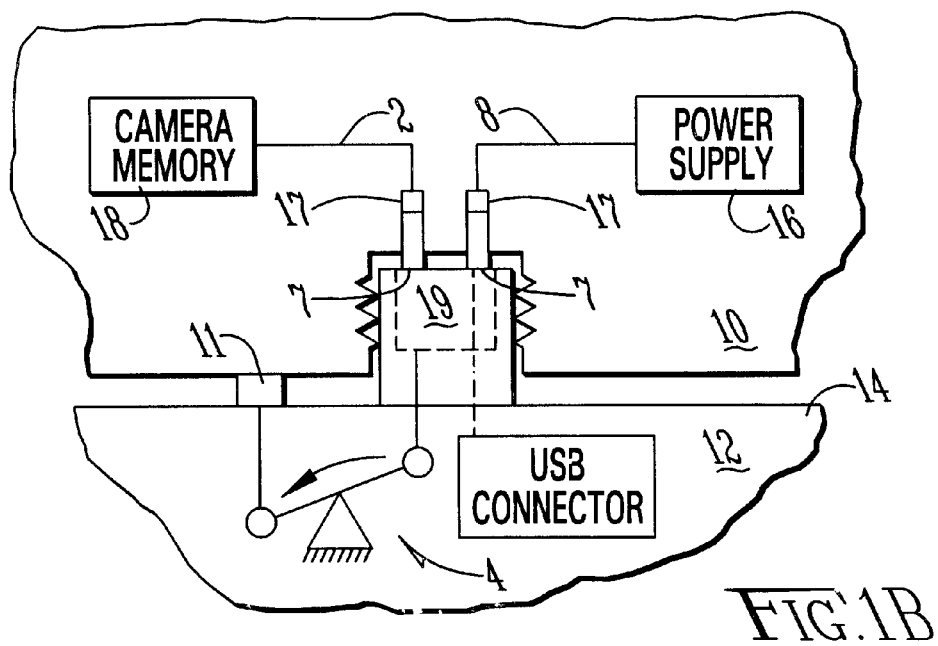
FIG. 1B illustrates a cross-sectional view of a digital camera mounted to the camera mounting surface of FIG. 2A.

Camera mount 12 includes a trigger 11 and a post 9. As seen in FIG. 1B, post 9 further includes male jack 19. Jack 19 includes a number of pins 7, in one example four. Electrical connections (not shown), including but not limited to wires or USB cable, are routed through the center of post 9 between the pins 7 and a USB connector located on mount 12. The USB connector may be connected by USB cable to a PC, notebook computer, CD-Writer, photoprinter or other device. Post 9 press-fits snugly into hole 13. Post 9 need not be threaded. Post 9 made be made of hard rubber or rubber-coated metal (including but not limited to rubber-coated steel). Camera mount 12 may be a surface of a camera tripod or other device to which digital and conventional cameras may be mounted.

FIG. 1B illustrates camera 10 mated to surface 14 of mount 12. As camera 10 contacts and presses down on trigger 11 (as camera 10 is mated to mount 12), pins 7 extend from post 9 and mate with pin contacts 17. As seen in FIG. 1A, pins 7 are not extended prior to trigger 11 being depressed. Trigger 11 is coupled jack 19 via mechanical linkage 4. Depressing trigger 11 causes mechanical linkage 4 to raise jack 19 within post 9, exposing pins 7 which engage contacts 17. The mating pins 7 and contacts 17 for data are connected to memory 18 through an I/O channel. The mating pins 7 and contacts 17 for power are connected directly to power supply 16.

In an alternative embodiment, a trigger can be implemented in which the camera is guided into alignment with a door located on the flat surface of the camera mount under the camera mounting hole. When the camera is lowered to the surface of the camera mount, the bottom of the camera depresses the trigger. The trigger is connected by a mechanical linkage, similar to the one outlined above, to the door. The door slides open, allowing a combined data/power connector to rise from within the body of the camera mount and protrude from the surface of the camera mount to be inserted into the mounting hole of the camera. The sides of the data/power connector are designed to snap-on the threads inside the camera mounting hole instead of screw-on grip.

Figure 2A:
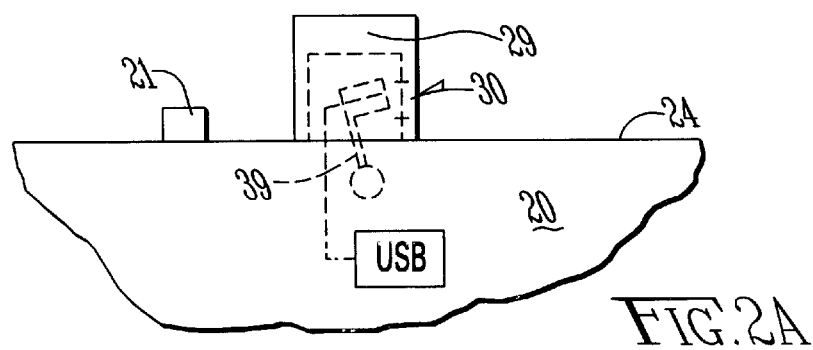
FIG. 2A illustrates a side view of a camera mounting surface.

In accordance with an embodiment of the invention, FIG. 2A illustrates a side cross-sectional view of a camera mount 20. Camera mount 20 includes a trigger 21 and a post 29. As seen in FIG. 2A, post 29 is hollow and includes a flag-like electrical contact 39. Electrical contact 39 includes four connections or pins (not shown). Preferably, two pins dedicated to power are electrically connected to a cable or wire 8 connected to a power supply 26 and two pins dedicated to data are electrically connected to a cable or wire 2 connected to a memory 28 (i.e., the processor of camera 10). The power and data pins are separated by an insulator. Electrical contact 39 functions as a USB connection. Electrical connections, including but not limited to wires or USB cable, are routed through post 29 between the pins of electrical contact 39 and a USB connector located on mount 12. Post 29 press-fits snugly into hole 13. Trigger 21 is coupled to flag-like contact 39 via mechanical linkage 40. Depressing trigger 21 causes contact 39 to pivot into position, allowing the front edge of the flag-portion to protrude through a slit 30 in the side of post 29 and engage contact pad 37 in camera 10.

Figure 2B:
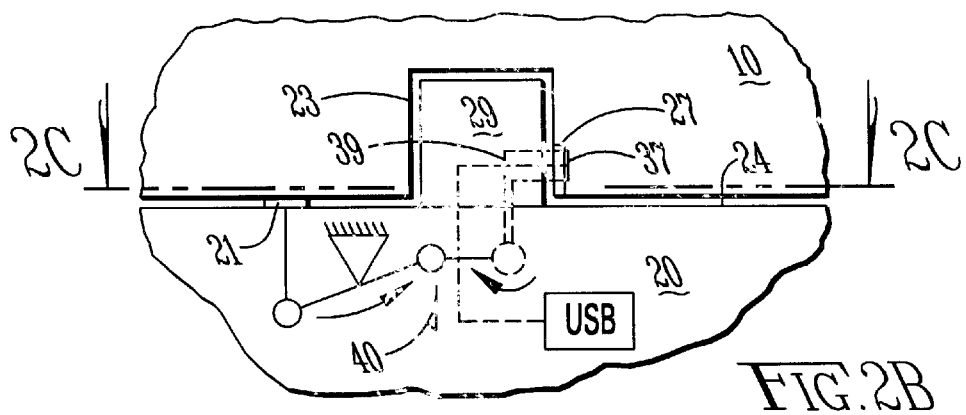
FIG. 2B illustrates a side view of a digital camera mounted to the surface of FIG. 1B.

FIG. 2B illustrates a side view of camera 10 mounted to surface 24 of mount 20. Camera 10 includes a power supply 26 (not shown) for powering camera 10, a memory 28 for storing digital images, and a threaded mounting hole 23 (threads not shown for clarity). Mounting hole 23 is threaded so as to allow camera 10 to be able to be mounted to the mounting screw of a conventional camera tripod or other similar mounting surface. Camera contact pad 37, located along a slit in the side of hole 23, includes pins 7 that mate to the pins 7 located on electrical contact 39. If the pins 7 on electrical contact 39 are male, the pins located on camera contact pad 37 are female. Contact pad 37 is electrically connected to memory 28 or power supply 26. The male/female pins 7 for data are connected to memory 28 through an I/O channel. The pins 7 for power on contact pad 37 are connected directly to power supply 26.

Figure 2C:
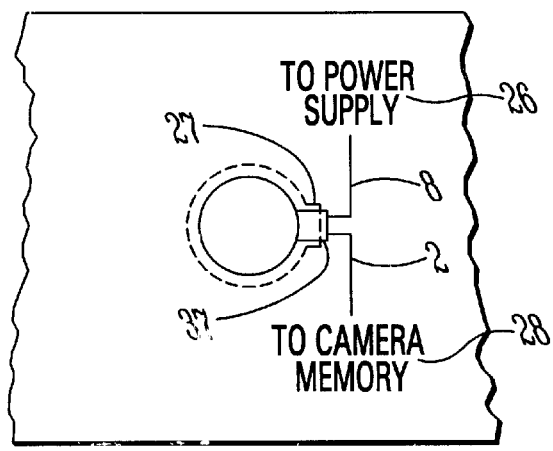
FIG. 2C illustrates a bottom view of a digital camera mounting hole.

FIG. 2C illustrates a bottom view of digital camera mounting hole 23. However, instead of hole 23 being formed with perfect threads, a cut is made in the side of hole 23 to form slot 27. The cut may be square, triangular, rectangular, or semicircular. FIG. 2C illustrates a rectangular cut, giving hole 23 the shape of a keyhole. Although the present embodiment illustrates a pivoting flag-like contact, a contact slide up slot 27 until the contact electrically connects with pad 37.

The above-described embodiments of the present invention are illustrative only and not limiting. It will thus be obvious to those skilled in the art that various changes and modifications may be made without departing from this invention in its broader aspects. Therefore, the appended claims encompass all such changes and modifications as falling within the true spirit and scope of this invention.

We claim:

1. A camera mount comprising:
   a body including a flat surface for mounting a camera;
   a hollow post on said flat surface wherein said post is sized to fit within a mounting hole of the camera;
   a trigger device for raising and lowering a first connector located within the hollow post wherein said first connector mates with a complementary connector located within the mounting hole of the camera; and
   a second connector located on the body for coupling to a cable wherein the second connector is electrically connected to said first connector.

2. The camera mount of claim 1, wherein the cable is coupled to a power source.

3. The camera mount of claim 1, wherein the cable is coupled to a memory device.

4. The camera mount of claim 1, wherein the first connector includes pins for data connections to a memory of the camera.

5. The camera mount of claim 1, wherein the first connector includes pins for power connections to a power supply of the camera.

6. The camera mount of claim 1, wherein the first connector is located within said hollow post.

7. The camera mount of claim 1, wherein the trigger device is connected to a mechanical linkage for raising and lowering the first connector.

8. The camera mount of claim 1, wherein the post press-fits snugly into the mounting hole of the camera.

9. The camera mount of claim 1, wherein the post is threaded.

10. The camera mount of claim 1, wherein the post is made of rubber.

11. The camera mount of claim 1, wherein the first connector includes a flag-shaped contact for connecting to a memory of the camera.

12. The camera mount of claim 1, wherein the first connector includes a flag-shaped contact for connecting to a power supply of the camera.

13. The camera mount of claim 1, wherein the first connector includes a flag-shaped contact for connecting to a memory of the camera and a power supply of the camera.

* * * * *